United States Patent [19]

Fontana et al.

[11] Patent Number: 5,901,172
[45] Date of Patent: May 4, 1999

[54] ULTRA WIDEBAND RECEIVER WITH HIGH SPEED NOISE AND INTERFERENCE TRACKING THRESHOLD

[75] Inventors: Robert J. Fontana, Rockville; J. Frederick Larrick, Jr., Silver Spring, both of Md.

[73] Assignee: Multispectral Solutions, Inc., Gaithersburg, Md.

[21] Appl. No.: 08/872,729

[22] Filed: Jun. 11, 1997

[51] Int. Cl.⁶ .............................. H04B 1/69; H04B 14/02; G01S 7/34; H04L 25/06
[52] U.S. Cl. .......................... 375/200; 375/256; 375/317; 375/340; 375/345; 329/311; 342/21; 342/89; 342/91; 342/94
[58] Field of Search ...................... 375/200, 256, 375/316, 317, 340, 345; 329/311; 342/21, 89, 91–95, 165

[56] References Cited

U.S. PATENT DOCUMENTS

| | | | |
|---|---|---|---|
| 3,662,316 | 5/1972 | Robbins | 375/256 |
| 3,781,878 | 12/1973 | Kirkpatrick | 342/26 |
| 3,983,422 | 9/1976 | Nicolson et al. | 327/195 |
| 4,688,041 | 8/1987 | Cronson et al. | 342/17 |
| 4,688,042 | 8/1987 | Cronson et al. | 342/19 |
| 4,695,752 | 9/1987 | Ross et al. | 327/18 |
| 4,813,057 | 3/1989 | Fullerton | 375/259 |
| 4,979,186 | 12/1990 | Fullerton | 375/239 |
| 5,337,054 | 8/1994 | Ross et al. | 342/93 |
| 5,363,108 | 11/1994 | Fullerton | 342/27 |
| 5,523,760 | 6/1996 | McEwan | 342/89 |
| 5,757,320 | 5/1998 | McEwan | 342/387 |

Primary Examiner—Stephen Chin
Assistant Examiner—Jeffrey W. Gluck
Attorney, Agent, or Firm—Kile McIntyre & Harbin

[57] ABSTRACT

An UWB receiver utilizing a microwave tunnel diode as a single pulse detector for short pulse, impulse, baseband or ultra wideband signals. The tunnel diode detector's bias point is set at system start-up, through an automatic calibration procedure to its highest sensitivity point relative to the desired bit error rate performance (based upon internal noise only) and remains there during the entire reception process. High noise immunity is achieved through the use of a high speed, adaptive dynamic range extension process using a high speed, Gallium Arsenide (GaAs) voltage variable attenuator (VVA) whose instantaneous attenuation level is determined by a periodic sampling of the ambient noise environment. Microprocessor-controlled detector time-gating is performed to switch the tunnel diode detector to the receiver front end circuitry for reception of an incoming UWB pulse, and alternately to ground through a resistor to discharge stored charge on the tunnel diode detector. In a second embodiment, two tunnel diode detectors are utilized in parallel, one biased for data detection and the other biased for noise detection, such that data detection can be interpreted based on simultaneous comparison to both a data threshold and a noise threshold.

27 Claims, 8 Drawing Sheets

TUNNEL DIODE

FIG. 7A PRIOR ART

SCHOTTKY DIODE

FIG. 7B PRIOR ART

BACK TUNNEL DIODE

FIG. 7C PRIOR ART

ULTRA WIDEBAND RECEIVER WITH HIGH SPEED NOISE AND INTERFERENCE TRACKING THRESHOLD

BACKGROUND OF THE INVENTION

1. Field of the Invention

This invention relates to the field of ultra wideband communications and radar. More particularly, it relates to reliable reception and processing of ultra wideband electromagnetic pulses in the presence of noise, strong interference and/or jamming.

2. Background of Related Art

One of the first ultra wideband (previously referred to as baseband, carrier-free or short pulse) receivers was patented in 1972 by Ken Robbins while at the Sperry Research Center, U.S. Pat. No. 3,662,316. This receiver utilized a "dispersionless" broadband transmission line antenna together with a biased tunnel diode located in the transmission line for detecting the total energy in a pulse and expanding the resultant output in the time domain so that conventional, lower speed circuitry may be used for processing. The tunnel diode was biased to operate as a monostable multivibrator as disclosed in 1962 in Gentile, S. P., *Basic Theory and Application of Tunnel Diodes*, Van Nostrand, N.J., ch. 8 "Pulse and Switching Circuits" (1962). The receiver took advantage of the tunnel diode's unique characteristic of changing state when the area under the current vs. time envelope, i.e., the charge carriers passing through the device, exceeded a prescribed number of pico-coulombs. This change in state yielded a recognizable, detectable event or output voltage. Sperry's tunnel diode detector (TDD) receiver was used in a number of applications including baseband communications, liquid level sensing, object detection and radar. It was soon observed, however, that the Robbins TDD was subject to operating point bias drift due to temperature and power supply fluctuations. This bias drift impacted negatively the system's overall sensitivity and increased the false alarm rate.

In 1976, Nicolson and Mara introduced a constant false alarm rate (CFAR) circuit to the tunnel diode detector receiver that is described in U.S. Pat. No. 3,983,422. The CFAR circuit employed a logic circuit that sampled noise dwells and data dwells to dynamically adjust a variable threshold of the tunnel diode. This feedback circuit operated in such a manner that the false alarm rate, as measured by the number of hits received due solely to noise during a fixed time interval, was held constant regardless of temperature fluctuations, power supply voltage changes, device aging, etc. The CFAR receiver was utilized in the development of baseband speed sensing, collision avoidance, and radar docking prototypes.

In 1987, an anti-jam circuit was introduced into the CFAR receiver. This is described in U.S. Pat. No. 4,688,041. Since the baseband receiver was extremely broadband, with typical bandwidths of hundreds of MHz to GHz, it was found to be extremely susceptible to in-band interference and jamming since the tunnel diode circuit could not distinguish between valid and unwanted signals. Such in-band signals caused a significant reduction in receiver sensitivity by causing the CFAR loop to back-off the sensitivity of the tunnel diode detector. The anti-jam circuit disclosed in U.S. Pat. No. 4,688,041 used the jamming signal itself (if sufficiently strong), or else an internally switched continuous wave (CW) signal, as a local oscillator signal to heterodyne the incoming signal prior to detection. However, this anti-jam circuit proved to be ineffective in the presence of barrage (broadband) noise jamming or interference, and/or multiple in-band CW interfences. In the case of barrage noise, no reference frequency is provided by the interference with which to down convert the incoming signal, and the system reverts to single-conversion superheterodyne operation with an internal first local oscillator. The broadband noise is also down converted with the signal, and no anti-jam improvement is obtained. In the latter case of multiple in-band CW interferers, the circuitry will use one of these tones, or a linear combination depending upon the third order intercept properties of the design. In this case, the remaining tones are also heterodyned to near baseband and act once again as strong in-band jamming signals.

Also in 1987, U.S. Pat. No. 4,695,752 disclosed a narrow range gate added to the existing baseband CFAR receiver. The reduction in range gate size had the effect of reducing unwanted noise and interference by more closely matching the detector with the received pulse duration. The inventor of this patent purports to achieve nanosecond range gate intervals through the use of two Germanium (Ge) and a single Gallium Arsenide (GaAs) tunnel diode.

In 1994, U.S. Pat. No. 5,337,054 to Ross and Mara disclosed a coherent processing tunnel diode UWB receiver. These inventors claim to have improved tunnel diode detector receiver sensitivity by using a tunnel diode envelope generator to perform a superheterodyne conversion whereby the available charge for triggering the tunnel diode is maximized. Ross and Mara considered only single pulse ultra wideband detectors; i.e., detectors which make a binary, or hard, decision (Logic 1 or Logic 0) at every sampling instant. However, their patent discloses a sliding average of detector hits, noise dwell or data dwell, in any group of thirty-two consecutive periods (col. 4, lines 35–39). Averaging of all hits, including data dwells, provides an average of the noise dwells which is skewed because of the inclusion of the data dwells. Moreover, to reduce the effects of the skewing, a large number of noise dwells must be detected for each data dwell detected, ultimately reducing data rates.

There have been other patented UWB receiver designs in which a multiplicity of pulses (typically several thousand) are first coherently added, or integrated, before a binary (bit) decision is made (e.g., U.S. Pat. Nos. 5,523,760; 4,979,186; and 5,363,108). The UWB detectors of the present invention do not require coherent addition of a multiplicity of pulses, but rather have sufficient sensitivity to operate on a single pulse basis.

Only false alarm rate is typically computed by previous UWB receiver/processor designs, and thus the system bit error rate (BER), and accordingly the receiver operating characteristic (ROC) are unknown. In practice, the tunnel diode bias is "backed off" from the CFAR level to reduce the BER to an acceptable level. Unfortunately, since the BER is a very sensitive function of the tunnel diode bias level, this can result in a significant reduction in receiver sensitivity to achieve a desired BER.

As disclosed in U.S. Pat. No. 3,662,316, in a tunnel diode UWB receiver, the tunnel diode changes state whenever the accumulated charge on the device exceeds a given threshold. Mathematically, the performance of the tunnel diode detector in additive white Gaussian noise (AWGN) can be described by the following set of equations:

$$P_d = \text{Probability}\left(\max_{0 \le t \le T} \int_0^t (s(u) + n_w(u)) du \ge T_h\right) \text{ and}$$

$$P_{fa} = \text{Probability}\left(\max_{0 \le t \le T} \int_0^t n_w(u) du \ge T_h\right)$$

where $P_d$ is the probability of detection, $P_{fa}$ is the probability of false alarm, $s(u)$ is the received UWB waveform, $n_w(u)$ is additive white Gaussian noise with double-sided power spectral density $N_0 B$, B is the detection signal bandwidth, T is the diode dwell sensitivity interval, and $T_h$ is a threshold value.

While previous designs of the CFAR tunnel diode receiver have functioned reliably as an ultra wideband single pulse detector, their use in modern communication and radar applications have presented numerous drawbacks:

1. The prior art designs remain susceptible to in-band interference and jamming, particularly broadband or barrage noise jamming and multiple CW interferers.
2. The requirement to continuously adjust bias to the tunnel detector to maintain a given constant false alarm rate (CFAR) conventionally requires a minimum number of noise dwells to take place for each data dwell—typically thirty-two or more noise dwells for each data dwell—to achieve false alarm rates less than a few percent. This severely restricts the maximum data rate at which a single detector can operate since data and noise dwells must operate at different time intervals. In addition, the speed at which the tunnel diode detector can respond to sudden changes in the electromagnetic environment is limited. Hence, impulsive noise (which is nearly always present) can create burst errors in the data stream, corrupting data integrity.
3. Receiver sensitivity is conventionally backed-off to achieve a desired BER, providing an UWB receiver which has reduced distance capability and slower data rates.

SUMMARY OF THE INVENTION

A microwave tunnel diode is utilized as a single pulse detector for short pulse, impulse, baseband or ultra wideband signals. The UWB receiver has a number of unique features which permit highly sensitive operation at extremely high speeds (multiple Mb/s) with high immunity to in-band jamming.

For instance, the tunnel diode detector bias point is preferably determined only once, and preferably at system start-up, through an automatic calibration procedure. In this fashion, the tunnel diode detector is set to its highest sensitivity point relative to the desired bit error rate performance based upon internal noise only, and remains at that point during the entire reception process. Conventional CFAR-based UWB receivers continually update the detector bias point, resulting in reduced detector sensitivity in the presence of in-band jamming (i.e., receiver back-off), and extremely slow response times because of the need to constantly recalculate the false alarm rate. Rather than adjust the bias to the tunnel diode detector, the present invention adjusts the attenuation of the incoming UWB signal. An adaptive dynamic range extension process using a high speed, Gallium Arsenide (GaAs) voltage variable attenuator (VVA) provides high noise immunity. The instantaneous attenuation level is determined by periodically sampling the ambient noise.

A high speed switch time-gates the tunnel diode detector by switching between a gate active mode in which the tunnel diode detector is connected to the receiver front end circuitry for reception of an UWB pulse; and a gate inactive mode in which the signal input is removed from the detector and charge stored in the tunnel diode detector is discharged. Conventional designs have previously used the tunnel diode bias voltage itself to gate the tunnel diode detector, resulting in reduced RF sensitivity due to transients induced by the bias switching circuitry.

It is therefore an object of the present invention to provide an UWB receiver which operates with extremely high sensitivity at extremely high speeds with high immunity to inband jamming.

It is a further object to provide a method of calibrating the bias threshold of an UWB receiver.

It is another object to provide an UWB receiver which biases a tunnel diode detector at its highest sensitivity point based on internal noise only.

It is a further object to provide an UWB receiver which uses a high speed, adaptive dynamic range extension process.

It is also an object of the present invention to provide an UWB receiver which switchably discharges the tunnel diode detector between data dwells.

An additional object is to provide an UWB receiver having separate data and noise dwell measurement circuitry.

BRIEF DESCRIPTION OF THE DRAWINGS

These and other objects will become readily apparent to those of ordinary skill in the art from the detailed description of the presently preferred exemplary embodiments with reference to the drawings, in which.

DETAILED DESCRIPTION OF ILLUSTRATIVE EMBODIMENTS

The tunnel diode detector circuitry and process steps of the present invention provide an UWB receiver which is highly immune to many forms of in-band jamming; can operate at extremely high data rates (tens to hundreds of megabits per second [Mb/s]; and provides a high speed threshold which compensates for the level of noise and guarantees a desired ROC performance. A TDD UWB receiver using this technique provides single pulse detection of a 200 $\mu$W (average power) UWB signal at distances exceeding 50 miles.

Figure 7A:
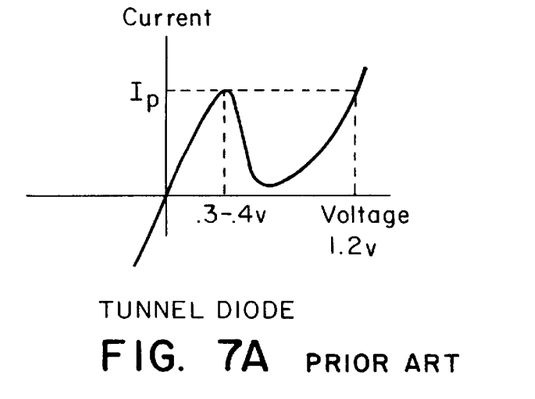
FIGS. 7A to 7C show the current-to-voltage (I-V) characteristics of a tunnel diode (FIG. 7A), a Schottky Diode (FIG. 7B) and a back tunnel diode (FIG. 7C), respectively.
Figure 7B:
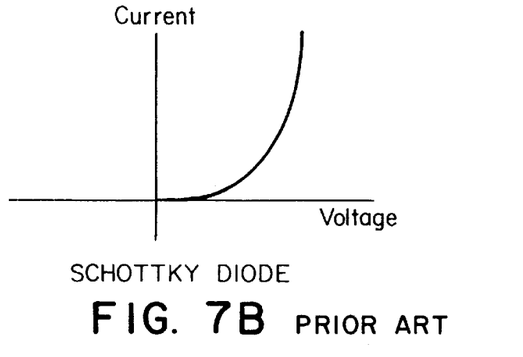
Figure 7C:
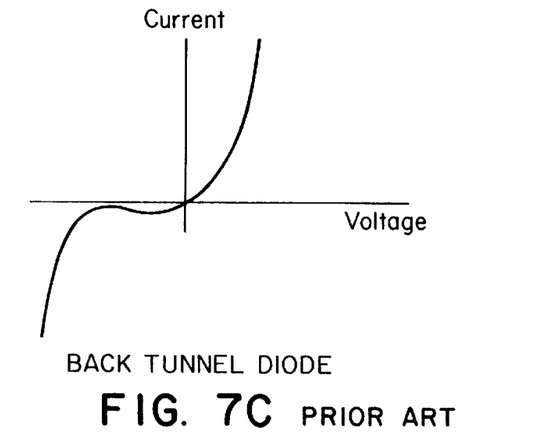

The tunnel diode(s) of the UWB receiver is (are) biased to operate near its peak current value $I_p$, which occurs just prior to the tunnel diode's AC negative resistance region as shown in FIG. 7A. This is in sharp contrast to the operation of a conventional microwave Schottky diode detector as shown in FIG. 7B, or a conventional back tunnel diode detector as shown in FIG. 7C, which rely on signal rectification with low or zero offset voltages for the detection of low level microwave signals.

The tunnel diode detector integrates directly the received voltage (current times input impedance) over the dwell interval. Since the integral of white Gaussian noise is equivalent to Brownian motion (also called a Wiener process after the mathematician Norbert Wiener), the tunnel diode detector transforms noise statistics in such a manner that the smaller the dwell interval, the larger the available signal-to-noise ratio. (Gikhman, I. I. et al. *Introduction to the Theory of Random Processes*, Dover Publications, New York (1969).

The detector according to the present invention achieves high processing gain without resorting to the coherent addition of multiple pulses required by other designs such as those disclosed by U.S. Pat. Nos. 5,523,760, 4,979,186, and 5,363,108. Moreover, unlike previous receiver designs that were limited to data rates of approximately 20 Kb/s (kilobit/second) for voice and data communications as well as radar applications, the UWB receiver according to the present invention is capable of data rates in the multiple Mb/s (megabit/second) range. This high speed operation enables full duplex or two-way transmission and reception of stereo quality voice, video imagery and other data rate critical applications.

Figure 1:
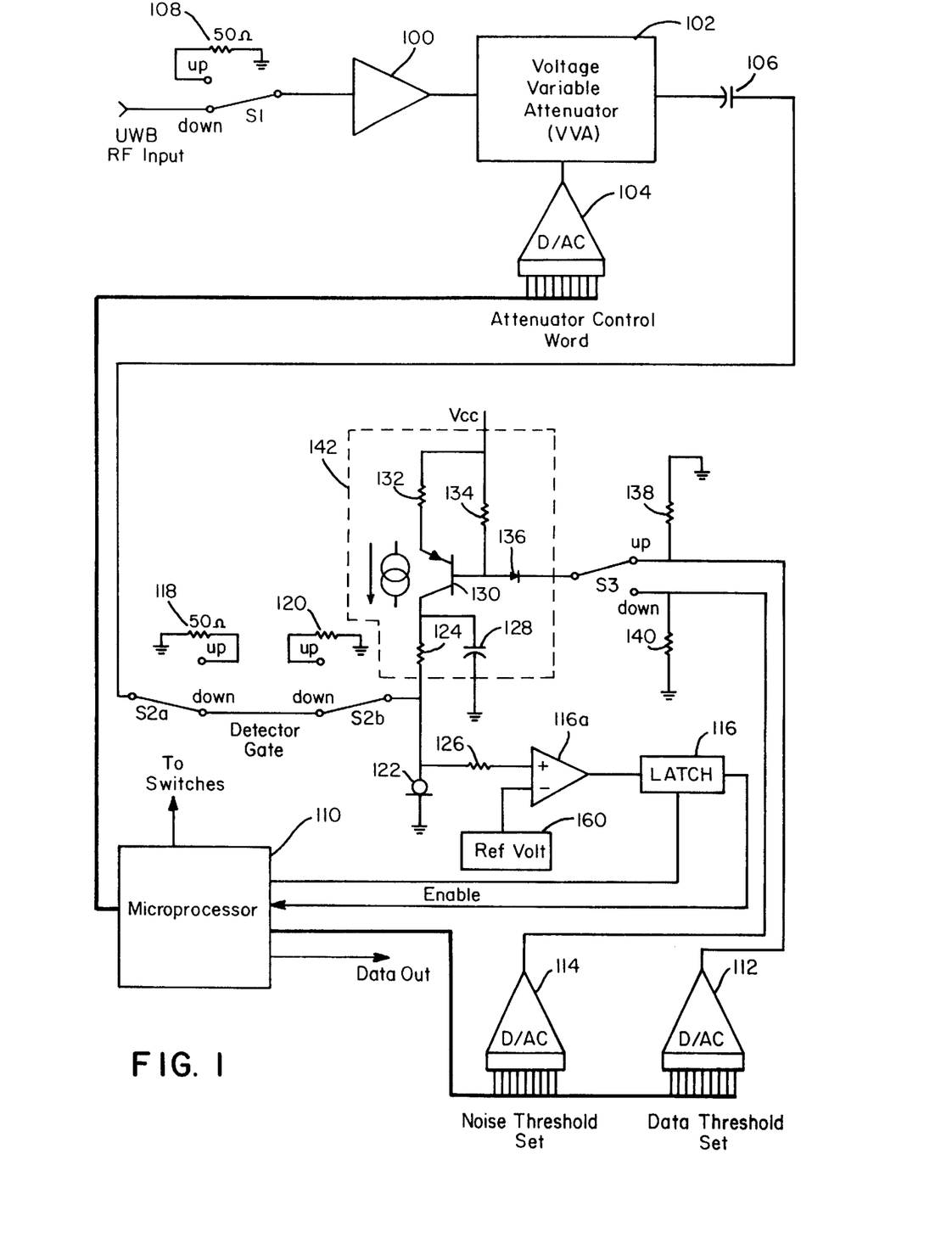
FIG. 1 is a schematic diagram of a high data rate UWB receiver according to a first embodiment of the present invention.

FIG. 1 shows a simplified schematic diagram of a first embodiment of a high speed UWB receiver according to the present invention. In FIG. 1, a received UWB pulse is input, through calibration switch S1, to a wideband, high gain RF amplifier 100. Calibration switch S1 is used to switch between an operational mode with switch S1 in the down position as shown in FIG. 1, and a calibration mode with switch S1 in the up position connecting the input of high gain RF amplifier 100 to ground through impedance matching resistor 108, which in this embodiment is 50 ohms. In the preferred mode, calibration switch S1 is switched only once after power-up and is activated by a programmable logic device or microprocessor 110.

Receiver 'Operational Mode'

With calibration switch S1 in the operation mode position, after RF amplification, the UWB pulse is input to voltage variable attenuator (VVA) 102, whose primary function is to provide high speed, adaptive dynamic range extension. The adaptive dynamic range extension process is particularly useful in the presence of in-band interference and noise.

According to the process, the attenuation of VVA 102 is adjusted, under microprocessor control, by the output of a digital-to-analog converter (DAC) 104. A ten bit DAC is sufficient for the purposes of DAC 104, although a 12 bit DAC is preferred to provide a greater margin for error. The DAC 104 settling time should be fast enough to provide adequate and timely control of the VVA 102 before the next gate change. As an example, for a 10 Mb/s data rate, the DAC 104 settling time should be less than approximately 100 ns. A slower DAC 104 can be used if some hysteresis is tolerable in the VVA 102 control setting.

The UWB signal is attenuated based on an instantaneous measurement of noise, allowing the tunnel diode detector to be maintained at its peak current value to provide maximum sensitivity, rather than the conventional method of backing-off the bias current of the tunnel diode detector based on the presence of noise. The particular VVA 102 used provides a 60 dB attenuation range, and is ideally linear. Significant non-linearities in the VVA 102 are compensated in the microprocessor 110 through corresponding control of DAC 104. To obtain a desired range of attenuation, multiple VVAs may be cascaded. For instance, two 30 dB VVAs may be cascaded to obtain 60 dB range of attenuation, or two 40 dB VVAs may be cascaded to obtain 80 dB range of attenuation.

Alternatively, a digitally-controlled microwave step attenuator may be substituted for the VVA 102. A step attenuator implements a set of discrete attenuation levels versus the continuum of levels achievable with VVA 102. Thus, it would have somewhat decreased performance in the presence of jamming and impulsive noise due to quantizing effects in achieving the desired operating bias. Although 2 dB increments have been implemented, the difference in the attenuation between levels of the step attenuator is preferably 0.5 dB or less.

The amplified, and VVA-attenuated, UWB pulse is subsequently fed via capacitor 106 to a detector gate formed by switch sections S2a, S2b and resistors 118, 120. Switch sections S2a and S2b act in tandem to alternatively apply and remove the conditioned microwave UWB pulse from the input terminal of a tunnel diode detector 122. When switch sections S2a and S2b are both in the DOWN position (as shown in FIG. 1), the UWB pulse is applied to tunnel diode detector 122. When both switch sections S2a, S2b are in the UP position, resistor 118 terminates the output of the amplifier 100/VVA 102 chain to prevent any potential instabilities due to a standing wave ratio (SWR) mismatch. At the same time, switch S2b shorts resistor 120 across tunnel diode detector 122 to remove any stored charge. The particular tunnel diode detector 122 used was obtained from GERMANIUM POWER DEVICES CORP. in Andover, Mass., Model No. TD272A.

Resistor 120 used with the disclosed embodiment has a value of 10 ohms which is selected to be sufficiently low to reset the tunnel diode detector 122 without causing significant current unbalance in the constant current source. The power source Vcc was 3.3 volts, although any conventional voltage supply level may be implemented with appropriate circuit component families.

A voltage-controlled constant current source 142 controls the bias on tunnel diode 122. Constant current source 142 includes transistor 130, resistors 124, 132 and 134, filtering capacitor 128, and protection diode 136. Transistor 130 is a Model No. 2N3906, resistor 124 has a value of 100 ohms, and filtering capacitor 128 has a capacity of 33 picofarads.

Switch S3 selects the voltage control mode of constant current source 142. In the UP position as shown in FIG. 1, switch S3 selects a 'Data Threshold' voltage control mode which sets the tunnel diode bias of the tunnel diode detector 122 for data detection during data dwells. The 'Data Threshold' mode is used to set the bias of tunnel diode detector 122 to the correct sensitivity portion of its voltage-current (V-I) characteristics for the detection of an UWB pulse, based on the desired BER. The data threshold setting circuit comprises resistor 138 and digital-to-analog converter (DAC) 112. Switches S2 and S3 are controlled by a high speed programmable logic device (not shown) which can either have its own oscillator or clock, or share an oscillator or clock with microprocessor 110.

Ten-bit DACs are sufficient for DACs 112 and 114, though twelve bit DACs provide a greater margin for error. DACs 112 and 114 are preferably set only once, during a calibration routine, and are not changed thereafter. The particular DACs 112, 114 used in the disclosed embodiments are LINEAR TECHNOLOGIES, Model No. LTC1453, which have a serial input. Of course, parallel input DACs may be implemented instead of serial input DACs.

In the DOWN position, switch S3 selects a 'Noise Threshold' voltage control mode which utilizes resistor 140 and DAC 114. The 'Noise Threshold' mode is used to set the bias of tunnel diode detector 122 to the correct sensitivity portion of its V-I characteristics for measuring either internal or external noise power. Switches S1, S2 and S3 are preferably suitably fast semiconductor switches, e.g., Gallium Arsenide (GaAs) semiconductor switches having low insertion loss at microwave frequencies. The particular switches used are available from MINI CIRCUITS, Model No. YSW-2-50dR.

During a dwell, when sufficient charge accumulates at the terminals of tunnel diode detector 122, it changes state thereby causing a voltage swing to occur across its terminals. Resistor 126 couples this voltage swing to a comparator latch 116 which includes comparator 116a, shown separately in FIG. 1 for clarity. A separate comparator could alternatively be implemented. A reference voltage source 160 applied to the negative input of the comparator is set to about 250 millivolts so that latch 116 detects and latches voltages above this reference voltage. Latch 116 generates a digital CMOS-compatible voltage signal for subsequent processing by a microprocessor 110. Any logic family may be utilized using appropriate output levels, e.g., TTL, ECL, etc. The particular comparator latch 116 used is a Model No. AD9696.

A noise dwell is defined to be the state in which the detector gate formed by switch S2 shown in FIG. 1 is enabled, i.e., in the DOWN position, and the threshold select switch S3 is in the 'Noise Mode' or DOWN position to select the Noise Threshold DAC 114. A Data Dwell is defined as the state in which switch S2 is in the enabled or DOWN position, and the threshold select switch S3 is in the 'Data Mode' or UP position to select the Data Threshold DAC 112. The frequency of data dwells is related to the signaling rate. For maximum speed, the number of noise dwells per data dwell is minimized, but in the preferred embodiment at least two noise dwells are required for each data dwell. In lower speed applications, accuracy can be improved by performing an increased number of noise dwells for each data dwell. For instance, in one application of the present invention, a 128 Kb/s data rate was implemented with forty noise dwells for each data dwell.

Figure 2:
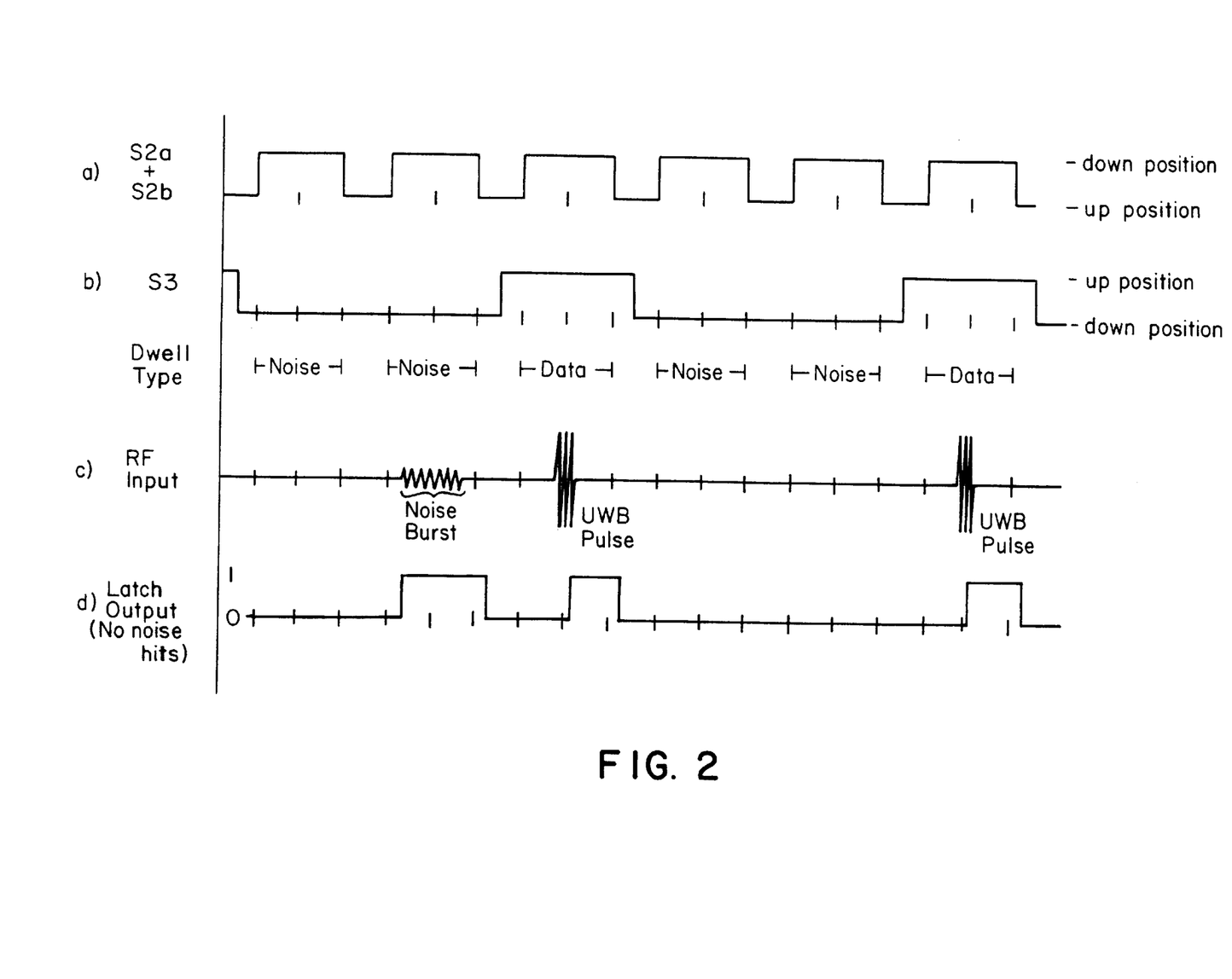
FIG. 2 is a timing diagram showing the operation of switches S1 to S3 in FIG. 1 with respect to an UWB received pulse, e.g., timing for two noise dwells per data dwell.

FIG. 2 is a timing diagram showing the operation of switches S2, S3 and latch 116 in the embodiment of FIG. 1 with respect to the RF input. FIG. 2 emphasizes the timing of switches S1 to S3 and is not drawn to scale. Waveform (a) of FIG. 2 shows the timing of data and noise dwells, with the dwell occurring when S2 (S2a and S2b) is in the down position. The type of dwell is defined by the position of switch S3 as shown in waveform (b). As shown in FIG. 2, two noise dwells are performed before each data dwell. Waveform (c) shows the position of the UWB pulse in the RF input, as well as a noise burst, with respect to the noise and data dwells. Waveform (d) shows the latching of both noise and data.

Receiver 'Calibration Mode'

To achieve high sensitivity for single pulse operation, it is important to calibrate the tunnel diode detector's 'Data Threshold' and 'Noise Threshold' settings. According to one embodiment of the present invention, the Data Threshold and Noise Threshold are established only once after power-up.

A method of calibration comprises the following steps:

1. Terminate the receiver front end into a matched impedance.

This is accomplished in the present embodiment by placing switch S1 in the UP position as shown in FIG. 1. A 50 Ω input termination permits calibration of tunnel diode detector 122 in the presence of only internally generated noise sources, e.g., detector shot noise, amplifier chain thermal noise (kTBF), etc.

2. Attenuate the amplified UWB input approximately 3 dB.

The amplified UWB input is attenuated in the present embodiment by the voltage variable attenuator (VVA) 102. An attenuation setting of X dB allows for drift in the receive amplifier chain (e.g., due to ambient temperature fluctuations, device aging, etc.) which could produce up to an X dB decrease in system gain. It has been found experimentally that a setting of approximately 3 dB is adequate for system gains of as much as 60 dB and over commercial temperature ranges (e.g., 0 to +70° C.).

3. Adjust noise threshold to determine the 'Noise CAL' setting.

The Noise Threshold setting is set before the Data Threshold setting. This is accomplished in the present embodiment shown in FIG. 1 by setting Threshold Select switch S3 to the DOWN or 'Noise Threshold Set' position to select the 'Noise Threshold' mode. Then, by performing noise dwells and subsequently adjusting DAC 114 under microprocessor control until approximately 50% of the noise dwells contain noise hits. This is the 'Noise CAL' setting for the tunnel diode detector 122.

4. Adjust data threshold to determine the 'Data CAL' setting.

The data threshold is adjusted by setting the Threshold Select switch S3 to the UP or 'Data Threshold Set' position to select the 'Data Threshold' mode. The data threshold is then adjusted by controlling DAC 114 so that one hit out of 1/(2*BER) hits occurs, where BER is the desired bit error rate. A 'hit' is an event latched by latch 116. As an example, if a BER of $10^{-3}$ is desired, adjust the data threshold so that only one hit is latched by latch 116 during the performance of 2000 data dwells. Thus, to determine the setting in this example at least 2000 data dwells are performed. To confirm a correct setting, an iterative process can be performed wherein as many as dozens of sets of dwell sequences are performed to achieve the desired data threshold level. To confirm a data threshold level it is useful to perform a number of sets of data dwell sequences, e.g., ten sets of 2000 data dwells, to ensure that the data threshold is set at a level which will achieve the desired BER.

5. Remove the matched impedance termination and connect the receiver front end to the antenna.

In the present embodiment, this is accomplished by switching switch S1 to the down position as shown in FIG. 1.

6. Determine attenuation value corresponding to 50% noise hits.

The 50% noise hits value is the point at which there is a 50% probability that noise will exceed the Noise Threshold. This is performed by holding the Noise Threshold of the present embodiment fixed at the Noise CAL setting, and by performing a sequence of noise dwells. The VVA 102 is adjusted to obtain approximately five out of ten noise hits (50%), and the DAC 104 setting is saved as 'VVA0.5'.

7. Determine attenuation value corresponding to a level above 50%, e.g., 70% noise hits.

Maintaining the Noise CAL setting fixed, decrease the attenuation of VVA 102 (i.e., providing increased sensitivity) until the tunnel diode detector 122 registers approximately seven out of ten noise hits (70%), and save the DAC 104 setting as 'VVA0.7'.

8. Determine attenuation value corresponding to a level below 50%, e.g., 30% noise hits.

Again maintaining the Noise CAL setting fixed, increase the attenuation of the VVA 102 (i.e., providing less sensitivity) until the tunnel diode detector 122 registers approximately three out of ten noise hits (30%), and save the DAC 104 setting as 'VVA0.3'.

Steps 6–8 may be performed in any order. Moreover, the particular values 30%, 50% and 70% can just as easily be other comperable values, e.g., 20%, 50% and 80%, or 10%, 50% and 90%. Ideally, the calibration cycles will mimic the operating conditions.

9. Calculate a minimum attenuator step size S required for noise/interference threshold tracking from the equation:

$$S = \min(|VVA_{0.7} - VVA_{0.5}|, |VVA_{0.5} - VVA_{0.3}|)$$

Too small a step size increases detector tracking response time, while too large a step size results in over/undershoot of the system sensitivity response characteristic which increases the attainable bit error rate. If using a step attenuator, the minimum step size should ideally correspond substantially to an integer multiple of the step size of the attenuator itself.

The Data Threshold is usually set higher than the Noise Threshold. Properly adjusted, the probability that a latched UWB data signal will be greater than the Data Threshold is great, with the probability of a false alarm due to noise being very low and based on the desired BER. In operation, the probability of noise is kept constant by adjustment of the DAC 104, and thus the probability of data being greater than the Data Threshold (i.e., the probability of a false alarm) is indirectly kept constant.

Figure 3:
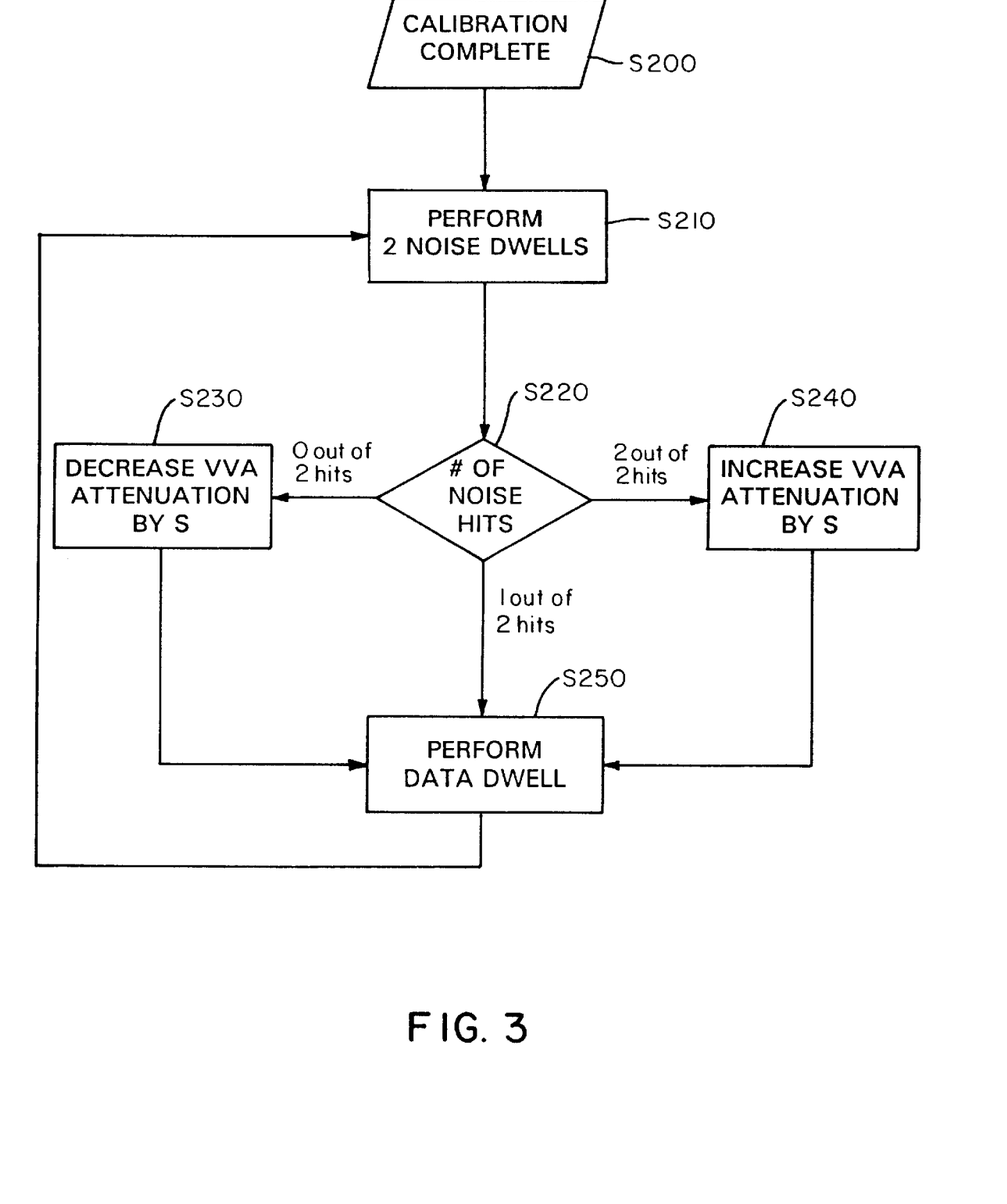
FIG. 3 is a flow diagram for the tunnel diode detector UWB receiver according to the present invention.

Operation of the tunnel diode detector 122 of the present embodiment during signal reception occurs as shown in the flow chart of FIG. 3 with general reference to FIG. 1.

The UWB receiver is initially and generally calibrated only once, preferably after power-up, as shown in step S200 of FIG. 3. Of course, the UWB receiver may be calibrated more than once, but need not be.

After calibration, at least two noise dwells are performed before each data dwell as shown in step S210.

In step S220, the number of noise hits, i.e., a detection event latched by latch 116, is determined from the two noise dwells performed in step S210. Of course, more than two noise dwells may be performed and a percentage of 'hits' may be acted on rather than on an absolute number of hits as shown in step S220 in FIG. 3. However, to maximize data rates, as few as two noise dwells provide satisfactory results.

If neither of the two noise dwells performed in step S210 resulted in a 'hit', then step S230 is performed to decrease the VVA 102 attenuation by the step increment S, and then the data dwell is performed as shown in step S250. If one of the two noise dwells resulted in a 'hit', then the data dwell is performed as shown in step S250 without any change in the attenuation of the VVA 102. In this instance, the noise detection would appear to have the desired probability of 50%. If both noise dwells performed in step S210 resulted in a 'hit', then step S240 is performed to increase the VVA 102 attenuation by the step increment S before performing the data dwell in step S250.

In conventional CFAR-based designs, a false alarm rate calculation requiring a large number of noise dwells was performed continuously, thereby reducing the allowable data rate significantly. In contrast, the present invention requires only two noise dwells to reliably determine whether to remove or insert additional attenuation of the amplified UWB pulse prior to detection by the tunnel diode detector 122. Accordingly, the sensitivity of tunnel diode detector 122 (which is effectively set by the combination of the Data Threshold and VVA attenuation values) can track changes in the noise and/or interference level at a much faster rate than conventional systems.

Figure 4:
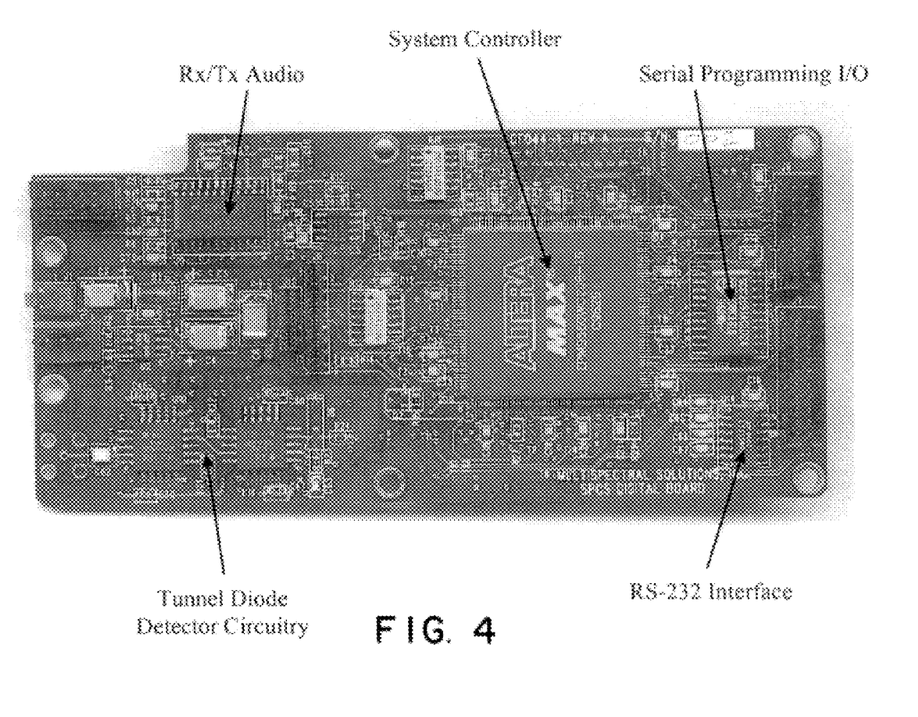
FIG. 4 is a photograph of a circuit board of a transceiver utilizing the present invention.

FIG. 4 shows the UWB receiver imbedded in a full duplex, voice/data ultra wideband transceiver. The RF section of this particular unit (lower left hand side) is wideband from a few MHz to beyond 4 GHz. Tunnel diodes with adequate response characteristics to 26 GHz and beyond are currently available, and thus the UWB receiver can readily accommodate a wide variety of center frequencies between a few MHz upwards toward 26 GHz.

During synchronization, the data dwell is time-shifted to initially acquire the signal for timing. During time-shifting, a window is moved a given number of clock cycles between data dwells until the data is detected. For example, a data dwell having a window of 62.5 nanoseconds is performed and analyzed to determine if data was detected. If not, the window is moved 1/8 of the width, i.e., 7.8333 ns, until the data is detected. Of course, other movement amounts are possible. Time-shifting of the data dwell is stopped when enough of a sync signal is detected to identify the signal. In the disclosed embodiment, a 40 bit sync signal was used with a 128 Kb/s signal wherein detection of six bits is sufficient for identification of the signal. The window is constantly adjusted by the microprocessor 110 to ensure that the data is in the center of the window. A programmable logic device (PLD) could be implemented instead of using microprocessor 110 to perform the time-shifting of the data dwell.

During a 'scan mode' in which the data dwell is essentially looking for a pulse, it is possible that a data pulse might occur during a noise dwell. That is, during the time at which synchronization to the data dwell intervals has not yet been completely achieved, the detected noise may include data. If the ratio of the number of noise dwells with respect to each data dwell is large (for example, greater that 32-to-1), a few data hits occurring during the noise dwells will not impact the threshold attenuation setting significantly. However, as this ratio becomes smaller, the number of data hits occurring during noise dwell intervals will eventually become sufficiently large so that the process will erroneously and unnecessarily reduce the UWB receiver sensitivity by increasing the attenuation setting of VVA 102. This action, in turn, will make initial signal acquisition more difficult because of reduced signal amplitude. That is, the data itself acts as a noise source, causing receiver sensitivity to be reduced to eliminate its effects.

Figure 5A:
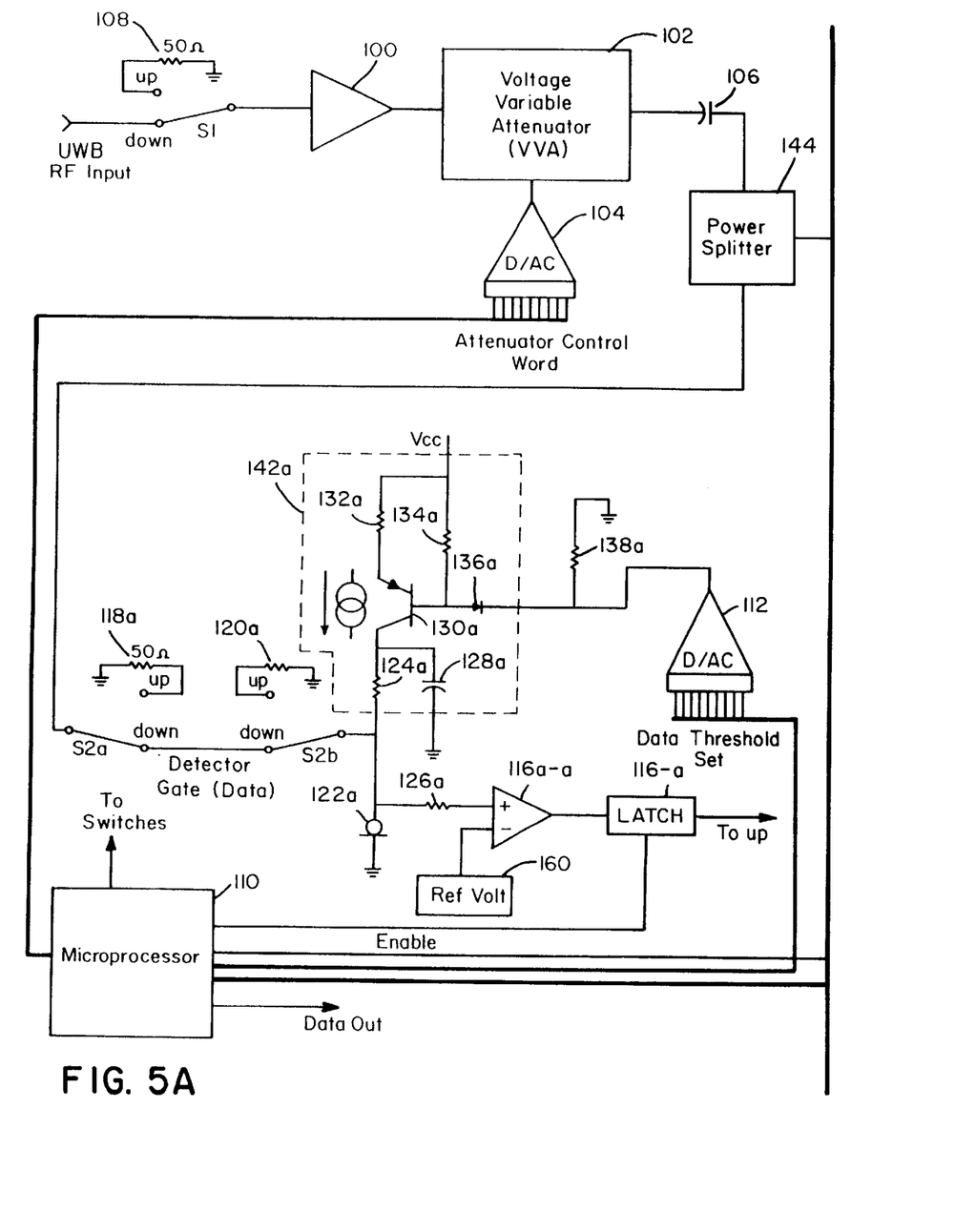
FIG. 5 is a schematic diagram of an ultra high data rate UWB receiver according to a second embodiment of the present invention.
Figure 5B:
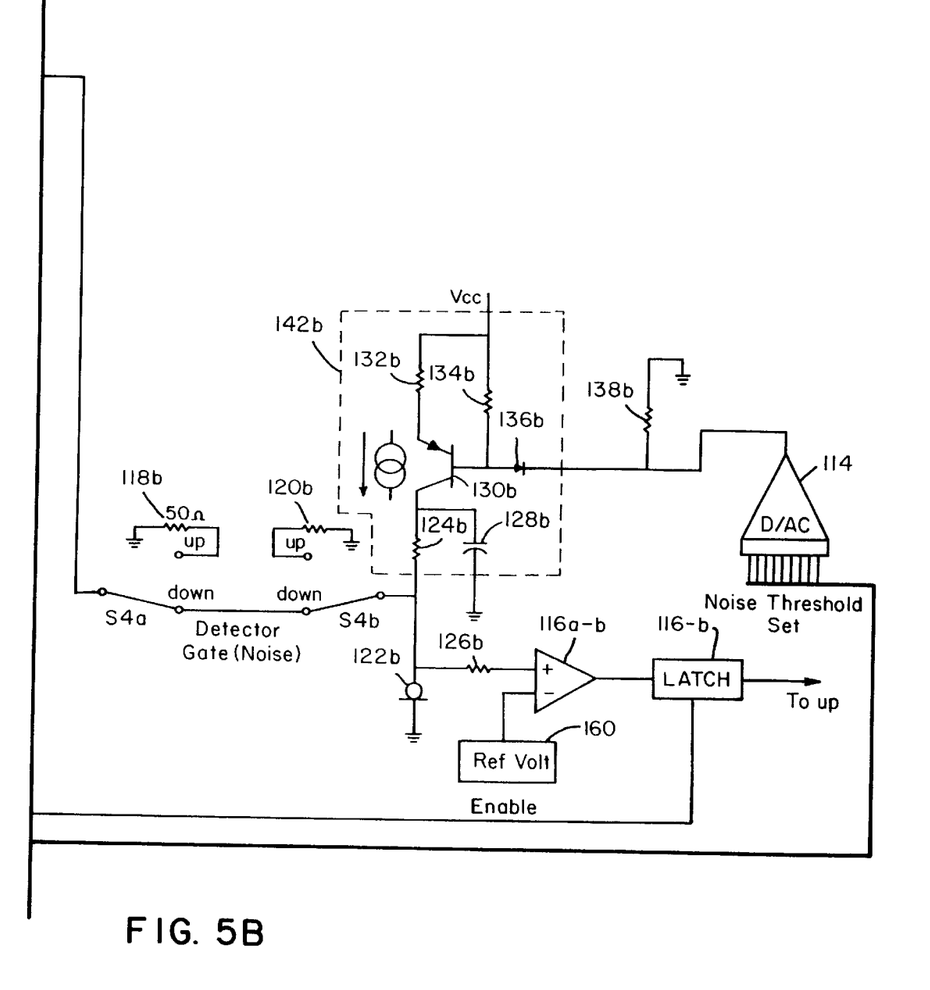

This problem can be overcome by a second embodiment of the present invention as shown in FIG. 5, which utilizes two tunnel diode detectors to allow for parallel data and noise dwells, thus allowing for even higher speed operation than that allowed by the single tunnel diode detector embodiment shown in FIG. 1. In this embodiment, all dwells are both data dwells and noise dwells.

In an UWB receiver utilizing a single tunnel diode detector, the maximum number of noise dwells that can occur for each data dwell is reduced as the data rate increases. The UWB receiver having two tunnel diode detectors—one for the detection of energy with respect to a noise threshold and the other for the detection of energy with respect to a data threshold, e.g., as shown in FIG. 5, has certain advantages over a single tunnel diode 122 design switched between a noise threshold and a data threshold as shown in FIG. 1. For instance, in a single tunnel diode design, as the data rate increases, the time between data dwells correspondingly decreases, reducing the number of noise dwells which can be performed. The use of two tunnel diode detectors as shown in the embodiment of FIG. 5 eliminates the correspondence between an increase in the data rate and a reduction in the number of noise dwells.

In FIG. 5, the UWB RF signal, after amplification and adaptive VVA-attenuation as disclosed herein above, is split into two paths using a wideband power splitter 144—one path for data processing with a first tunnel diode detector 122a' and the second path for noise processing with a second tunnel diode detector 122b. Each of the individual detector gates S2a/S2b, S4a/S4b, constant current sources 142a, 142b, latches 116a, 116b, digital-to-analog converters, 104, 112, 114, and various resistors, capacitors and other components are as described above with respect to FIG. 1 but duplicated as shown for use with two tunnel diode detectors. Two independent tunnel diode detectors 122a, 122b are provided so that noise and data intervals are kept physically separate and thus can operate autonomously. This permits parallel, simultaneous processing of a data signal path and a noise signal path based respectively on a calibrated data threshold and a noise threshold but based jointly on the attenuation of a common signal attenuation element.

During every dwell, the embodiment of FIG. 5 can determine whether the received energy satisfies any one of the following conditions:

1. The received energy is less than the noise threshold as detected by tunnel diode detector 122b;
2. The received energy exceeds the noise threshold but is less than the data threshold based on detection results of both tunnel diode detectors 122a and 122b; or
3. The received energy is greater than both the noise and data thresholds.

By determining which condition is met during the scan mode, the UWB receiver's microprocessor 110 can discriminate between a noise or data hit during each dwell, and adjust the level of attenuation in the VVA 102 accordingly. This is a significant advantage over the single detector circuit, e.g., as shown in FIG. 1, which can only determine conditions (1) and part of (3), i.e., whether the energy exceeded the noise threshold during a noise dwell, or whether the energy exceeded the data threshold during a data dwell. In the embodiment of FIG. 1, because only one bias is applied to the single tunnel diode detector 122 at any one time, the condition (2) cannot be determined with certainty. However, this additional information can be determined by using two separate tunnel diode detectors 122a, 122b as shown in FIG. 5. The two tunnel diode detectors 122a, 122b do not need to be matched because each is calibrated separately.

If more than one dwell is performed for each data bit period, then during these X dwells, at most a single hit exceeding the data threshold should occur due to data. Thus, if two or more hits exceed the data threshold in a single bit period, it is presumed that at least one of these hits must be due to noise or interference. In the embodiment of FIG. 5, the independent noise tracking process makes a corresponding reduction in the sensitivity of the receiver by increasing the attenuation of VVA 102 in this instance. The step size for this reduction can be determined during threshold calibration using techniques similar to those described herein above.

Figure 6:
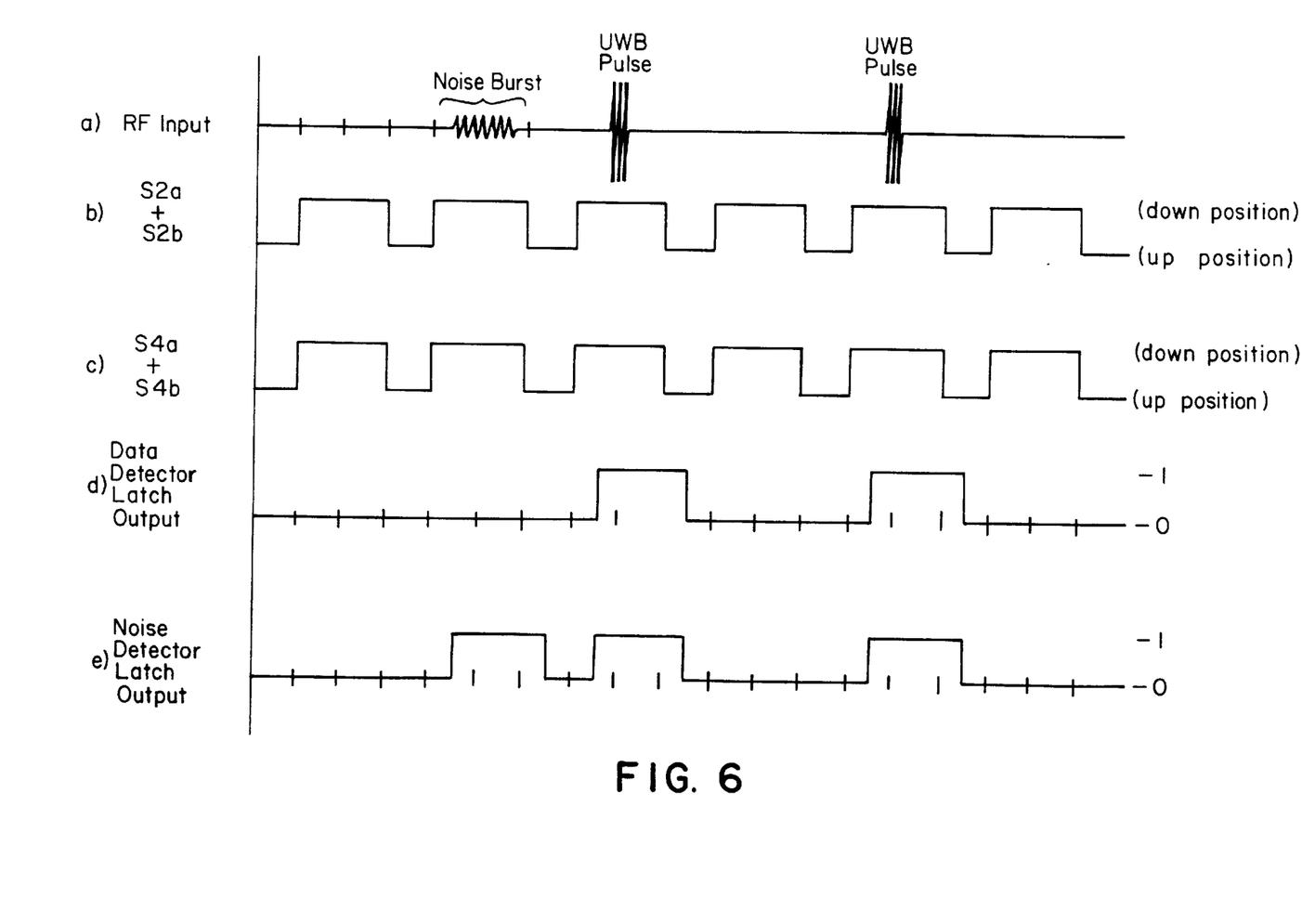
FIG. 6 is a timing diagram of the circuit of FIG. 5.

The timing of switches S2 and S4, and latches 116 of the embodiment of FIG. 5 is shown in FIG. 6. Waveform (a) in FIG. 6 shows the RF input including a noise burst. Waveforms (b) and (c) show that all dwells are both data and noise dwells. Waveform (d) shows that data is latched if present during the dwells, while noise is latched if present by the noise detector latch 116b but not by the data detector latch 116a as shown in waveform (e). Thus, the noise burst can be distinguished and does not cause a false alarm.

UWB transmitters are disclosed in a U.S. Patent Application filed on May 16, 1997 entitled "Frequency Adaptive Ultra-wideband Transmitter" by Larrick, Jr. et al., and commonly owned with the present application. This U.S. Application is explicitly incorporated herein by reference.

While the invention has been described with reference to the exemplary preferred embodiments thereof, those skilled in the art will be able to make the various modifications to the described embodiments of the invention without departing from the true spirit and scope of the invention.

We claim:

1. An ultra wideband receiver comprising:

an antenna;

a variable attenuator receiving an output from said antenna;

an ultra wideband detector to detect an ultra wideband signal passed through said variable attenuator; and a detector gate to switch said ultra wideband detector between a dwell position wherein an ultra wideband signal is applied to said ultra wideband detector, and a termination position wherein an anode of said ultra wideband detector is connected to ground through a resistance, said ultra wideband detector being biased during both said dwell position and said termination position of said detector gate.

2. The ultra wideband receiver according to claim 1, wherein:

said ultra wideband detector is a tunnel diode.

3. An ultra wideband receiver comprising:

an antenna;

a variable attenuator receiving an output from said antenna;

an ultra wideband detector to detect an ultra wideband signal passed through said variable attenuator;

a current controller having both a fixed data threshold output level and a fixed noise threshold output level to bias said ultra wideband detector; and a processor to process an output of said ultra wideband detector.

4. The ultra wideband receiver according to claim 3, wherein:

said ultra wideband detector is a tunnel diode.

5. An ultra wideband receiver comprising:

an antenna;

a variable attenuator receiving an output from said antenna;

an ultra wideband detector to detect an ultra wideband signal received from an output of said variable attenuator;

a processor to process an output of said ultra wideband detector; and a calibration switch to switch an input to said variable attenuator from said antenna to an impedance-matched termination terminal.

6. The ultra wideband receiver according to claim 5, wherein:

said ultra wideband detector is a tunnel diode.

7. An ultra wideband receiver comprising:

an antenna;

a variable attenuator receiving an output from said antenna;

an ultra wideband detector to detect an ultra wideband signal passed through said variable attenuator;

a constant current source having at least two output current settings to bias said ultra wideband detector;

a first threshold controller to set said constant current source to a first one of said at least two output current settings; and a second threshold controller to set said constant current source to a second one of said at least two output current settings.

8. The ultra wideband receiver according to claim 7, further comprising:

a comparator to sense an output of said ultra wideband detector.

9. The ultra wideband receiver according to claim 7, wherein:

said ultra wideband detector is a tunnel diode.

10. A method of detecting an ultra wideband signal with an ultra wideband detector, said method comprising:

determining a first bias to be applied to said ultra wideband detector based on a probability of noise detection of about 50%;

determining a second bias to be applied to said ultra wideband detector based on a probability of noise detection below a predetermined amount set by a desired bit error rate (BER);

alternately switching between said first bias applied to said ultra wideband detector and said second bias applied to said ultra wideband detector; and adjusting an attenuation level of said ultra wideband signal during a data dwell based on the occurrence of noise detected during at least one noise dwell.

11. The method according to claim 10, wherein:

said ultra wideband detector is a tunnel diode.

12. The method according to claim 11, further comprising, after said step of determining said first bias and said second bias:

maintaining said determined first bias and said determined second bias fixed.

13. A method of receiving an ultra wideband signal, comprising:

(i) determining a first bias level of an ultra wideband detector to detect a noise floor with a predetermined probability;

(ii) determining a second bias level of said ultra wideband detector to detect data with a predetermined maximum bit error rate (BER);

(iii) determining an attenuation level of a received ultra wideband signal necessary to maintain said predetermined probability of detection of noise floor by said ultra wideband detector, based on a result of at least two noise dwells with said ultra wideband detector biased at said first bias level;

(iv) adjusting said attenuation level based on a result of step (iii)

(v) performing a data dwell with said ultra wideband detector biased at said second bias level; and (vi) repeating steps (iii) to (v) until reception of said ultra wideband signal is completed.

14. The method of receiving an ultra wideband signal according to claim 13, wherein:

said ultra wideband detector is a tunnel diode.

15. The method of receiving an ultra wideband signal according to claim 14, further comprising:

time-shifting said data dwell to synchronize an ultra wideband receiver to receive said ultra wideband signal with an ultra wideband signal source.

16. The method of receiving an ultra wideband signal according to claim 14, wherein:

said steps (i) and (ii) are performed only once after power-up of an ultra wideband receiver to receive said ultra wideband signal.

17. An ultra wideband receiver comprising:

an antenna;

a variable attenuator receiving an output from said antenna;

a first ultra wideband detector to detect an ultra wideband signal passed through said variable attenuator;

a second ultra wideband detector to detect noise passed through said variable attenuator; and a processor to process an output of said first ultra wideband detector and an output of said second ultra wideband detector to interpret said ultra wideband signal.

18. The ultra wideband receiver according to claim 17, wherein:

each of said ultra wideband detectors is a tunnel diode.

19. The ultra wideband receiver according to claim 17, further comprising:

a first latch to latch an output of said first ultra wideband detector; and a second latch to latch an output of said second ultra wideband detector.

20. An ultra wideband receiver comprising:

an antenna;

a variable attenuator receiving an output from said antenna;

a first ultra wideband detector to detect an ultra wideband signal passed through said variable attenuator;

a second ultra wideband detector to detect noise passed through said variable attenuator;

a first detector gate to switch said first ultra wideband detector between a dwell position wherein an ultra wideband signal is applied to said first ultra wideband detector, and a termination position wherein an anode of said first ultra wideband detector is connected to ground through resistance; and a second detector gate to switch said second ultra wideband detector between a dwell position wherein said ultra wideband signal is applied to said second ultra wideband detector, and a termination position wherein an anode of said second ultra wideband detector is connected to ground through resistance.

21. The ultra wideband receiver according to claim 20, wherein:

said first ultra wideband detector and said second ultra wideband detector are each a tunnel diode.

22. An ultra wideband receiver comprising:

an antenna;

a variable attenuator receiving an output from said antenna;

a first ultra wideband detector to detect an ultra wideband signal passed through said variable attenuator;

a second ultra wideband detector to detect noise passed through said variable attenuator;

a processor to process an output of said first ultra wideband detector and an output of said second ultra wideband detector; and a calibration switch to switch an input to said variable attenuator from said antenna to an impedance-matched termination terminal.

23. The ultra wideband receiver according to claim 22, wherein:

said first ultra wideband detector and said second ultra wideband detector are each a tunnel diode.

24. A method of receiving an ultra wideband signal, comprising:
- (i) determining a bias level of a first ultra wideband detector to detect a noise floor with a predetermined probability;
- (ii) determining a bias level of a second ultra wideband detector to detect data with a predetermined maximum bit error rate (BER);
- (iii) determining an attenuation level of a received ultra wideband signal to maintain said predetermined probability of detection of noise by said first ultra wideband detector, based on an output of said first ultra wideband detector and an output of said second ultra wideband detector during at least two dwells;
- (iv) adjusting said attenuation level based on a result of step (iii)
- (v) performing a data dwell to detect a presence of data in said ultra wideband signal; and
- (vi) repeating steps (iii) to (v) until reception of said ultra wideband signal is completed.

25. The method of receiving an ultra wideband signal according to claim 24, wherein:

each of said ultra wideband detectors is a tunnel diode.

26. The method of receiving an ultra wideband signal according to claim 24, further comprising:

time-shifting said data dwell to synchronize an ultra wideband receiver to receive said ultra wideband signal with an ultra wideband signal source.

27. The method of receiving an ultra wideband signal according to claim 24, wherein:

said steps (i) and (ii) are performed only once after power-up of an ultra wideband receiver to receive said ultra wideband signal.

* * * * *